US010198406B2

(12) United States Patent
Pan et al.

(10) Patent No.: US 10,198,406 B2
(45) Date of Patent: *Feb. 5, 2019

(54) MODIFYING NATIVE DOCUMENT COMMENTS IN A PREVIEW

(71) Applicant: Dropbox, Inc., San Francisco, CA (US)

(72) Inventors: Matteus Pan, San Francisco, CA (US); Jean-Denis Greze, San Francisco, CA (US); Daniel Horn, Palo Alto, CA (US); Bo Hu, HIllsborough, CA (US); Richard W. Chan, San Francisco, CA (US); Andy Yang, San Francisco, CA (US); Philip Rha, San Francisco, CA (US); Adhiraj Somani, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,331

(22) Filed: Dec. 22, 2016

(65) Prior Publication Data

US 2017/0103045 A1  Apr. 13, 2017

Related U.S. Application Data

(63) Continuation of application No. 14/523,756, filed on Oct. 24, 2014, now Pat. No. 9,535,883.

(51) Int. Cl.
*G06F 17/22* (2006.01)
*G06F 17/21* (2006.01)
*G06F 17/24* (2006.01)

(52) U.S. Cl.
CPC .......... *G06F 17/212* (2013.01); *G06F 17/211* (2013.01); *G06F 17/241* (2013.01)

(58) Field of Classification Search
CPC ............ G06F 17/2247; G06F 17/2264; G06F 17/2235; G06F 17/212; G06F 17/241; G06F 17/30905; G06F 17/211
(Continued)

(56) References Cited

U.S. PATENT DOCUMENTS 6,266,683 B1   7/2001  Yehuda et al.
6,473,754 B1  10/2002  Matsubayashi et al.
(Continued)

FOREIGN PATENT DOCUMENTS

JP   2004-030582 A   1/2004
JP   2004-501450 A   1/2004
(Continued)

OTHER PUBLICATIONS

PCT International Search Report and Written Opinion, PCT Application No. PCT/IB2015/056609, Nov. 19, 2015, 10 pages.
(Continued)

*Primary Examiner* — Scott T Baderman
*Assistant Examiner* — Hassan Mrabi
(74) *Attorney, Agent, or Firm* — Fenwick & West LLP (57) ABSTRACT

A document preview system provides previews of a native document to client devices. The previews include comments associated with native objects in the native document. The document preview system identifies bounding areas in the preview associated with the native objects, which may be identified by the rendering markers applied to the native document prior to rendering. Using the bounding areas, the document preview system identifies comments for the native document and determines the location to display the comment using native objects associated with the comment. When a new comment is received from a user for a preview of a native document, the document preview system determines native objects for the new comment that match a
(Continued)

user's selection for placing the new comment. The new comment is inserted with the native objects in the native document.

30 Claims, 4 Drawing Sheets

(58) Field of Classification Search
USPC ............... 715/274, 205, 227, 230, 234, 243
See application file for complete search history.

(56) References Cited

U.S. PATENT DOCUMENTS

| | | |
|---|---|---|
| 6,551,357 B1 | 4/2003 | Madduri |
| 8,032,832 B2 | 10/2011 | Russ et al. |
| 8,151,114 B2 | 4/2012 | Chaudhury et al. |
| 8,418,051 B1 | 4/2013 | Bourdev |
| 8,467,714 B2 * | 6/2013 | Ziv-El .................... G09B 7/02 434/350 |
| 2003/0033297 A1 | 2/2003 | Ogawa |
| 2003/0145281 A1 | 7/2003 | Thames et al. |
| 2003/0200211 A1 | 10/2003 | Tada et al. |
| 2004/0139400 A1 * | 7/2004 | Allam .................. G06F 17/212 715/201 |
| 2005/0044295 A1 | 2/2005 | Wakeam et al. |
| 2005/0053283 A1 | 3/2005 | Wakeam et al. |
| 2005/0289452 A1 | 12/2005 | Kashi et al. |
| 2006/0031746 A1 | 2/2006 | Toepfer et al. |
| 2006/0031755 A1 | 2/2006 | Kashi |
| 2006/0061796 A1 | 3/2006 | O'Sullivan |
| 2006/0106822 A1 | 5/2006 | Lee et al. |
| 2006/0147117 A1 | 7/2006 | Wakeam et al. |
| 2006/0218171 A1 * | 9/2006 | Wakeam ............ G06K 9/00409 |
| 2007/0291297 A1 * | 12/2007 | Harmon ................ G06F 17/212 358/1.15 |
| 2009/0049053 A1 | 2/2009 | Barker et al. |
| 2009/0217158 A1 | 8/2009 | Bailey |
| 2009/0254529 A1 | 10/2009 | Goldentouch |
| 2010/0011282 A1 | 1/2010 | Dollard et al. |
| 2010/0107045 A1 | 4/2010 | Filippova et al. |
| 2010/0268694 A1 | 10/2010 | Denoue et al. |
| 2010/0331041 A1 | 12/2010 | Liao et al. |
| 2011/0173188 A1 * | 7/2011 | Walsh ............... G06F 17/30905 707/722 |
| 2011/0219003 A1 | 9/2011 | Bi |
| 2011/0252304 A1 | 10/2011 | Lemonik et al. |
| 2012/0072422 A1 | 3/2012 | Rollins |
| 2013/0031453 A1 | 1/2013 | Griffiths et al. |
| 2013/0031454 A1 | 1/2013 | Griffiths et al. |
| 2013/0031455 A1 | 1/2013 | Griffiths et al. |
| 2014/0033015 A1 | 1/2014 | Shaver |
| 2014/0215303 A1 | 7/2014 | Grigorovitch et al. |
| 2015/0081681 A1 | 3/2015 | Vohra et al. |
| 2015/0206447 A1 * | 7/2015 | Vahid .................... G09B 5/02 434/362 |

FOREIGN PATENT DOCUMENTS

| | | |
|---|---|---|
| JP | 2004-272684 A | 9/2004 |
| JP | 2005-018390 A | 1/2005 |
| JP | 2007-316873 A | 12/2007 |
| JP | 2011-514993 A | 5/2011 |
| JP | 2014-071634 A | 4/2014 |
| WO | WO 01/98927 A2 | 12/2001 |
| WO | WO 03/094040 | 11/2003 |

OTHER PUBLICATIONS

Kahan, J. et al., "Annotea: An Open RDF Infrastructure for Shared Web Annotations," Computer Networks, Aug. 5, 2002, pp. 589-608, vol. 39, No. 5.
United States Office Action, U.S. Appl. No. 14/523,756, dated Oct. 6, 2015, 14 pages.
United States Office Action, U.S. Appl. No. 14/523,756, dated Apr. 6, 2015, 12 pages.
United States Office Action, U.S. Appl. No. 14/523,756, dated Jan. 6, 2015, 12 pages.
Japanese Office Action, Japanese Patent Application No. 2017-522026, dated Nov. 2, 2018, 9 pages.
Kurihara, Ryo, Free to Underline and Memo: Writing Annotations to PDF, Mac Fan, Japan, Mynavi Corporation, Jun. 1, 2012, vol. 20, Issue 6, 5 pages.

* cited by examiner

MODIFYING NATIVE DOCUMENT COMMENTS IN A PREVIEW

CROSS REFERENCE TO RELATED APPLICATIONS

This application is a continuation of U.S. application Ser. No. 14/523,756, filed Oct. 24, 2014, now U.S. Pat. No. 9,535,883, which is incorporated by reference in its entirety.

BACKGROUND

This disclosure relates generally to previewing documents, and in particular to viewing and editing comments in a document from a document preview.

Users store documents online where they may be accessible by many different users and by different devices. When users browse to view these documents, it is typically difficult to review or comment on a document unless the user downloads and accesses the document using a native application on the user's device. As examples, these native documents may include word processing documents, spreadsheets, presentations, and source code, which are typically modified by dedicated, full-service applications on a client device. In addition, when systems provide previews to a user of a document, the preview may often omit important aspects of the document, such as comments or other supplemental data about the document that are typically not directly reflected in the text or other content of the document.

SUMMARY

A document preview system stores documents in their native format and provides previews of the native documents in a non-native form, such as in a web browser, to users accessing the document preview system. The document preview system permits users to view comments and other markups to the document at the correct location in the preview, and permits users to add and modify comments in the preview. These added and modified comments are inserted in the native document at the location highlighted by a user in the preview.

To correctly display and insert comments to the document, the document preview system identifies the location in the rendered preview that corresponds to portions of the native document. To identify these locations, the document preview system inserts a rendering marker associated with each native object in the native document. A native object is an object in the native application representing a particular piece of renderable content, such as a character, word, sentence, or paragraph. In one embodiment, each word is identified by the document preview system as a native object. The rendering marker is a unique marker that identifies the associated native object, and does not affect the display of the document when rendered. In one embodiment, the rendering marker is a hypertext link associated with each native object. The rendering marker is added to the native document for each native object. When the native document is rendered into a preview, the document preview system generates an identification of each rendering marker and a bounding area for the location at which the rendering marker appears in the preview. The bounding area indicates a page and pixel locations of the rendering marker. The rendering marker and bounding area are associated with the native objects in a mapping table. By identifying a bounding area for each rendering marker (and associated native object), the document preview system can identify a relationship between locations in the rendered preview and native objects in the native document.

When a client device requests a preview of a native document in a browser, the document preview system accesses the native document and obtains comments in the native document along with the native objects associated with the comments. The document preview system identifies the bounding areas of the native objects associated with each comment and combines them to identify a bounding area of the comment. The document preview system provides the preview for display by the client device and provides the comments and associated comment bounding areas to correctly place the comments in the user interface display of the client device. When a user interacts with the preview to add a comment, the user's selection of content is provided to the document preview system. The selection of content is analyzed to determine bounding areas of the user's selection, and matched with the bounding areas in the mapping table to identify the native objects designated by the selection. The added comment is inserted in the native document designating the native objects indicated by the user selection.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
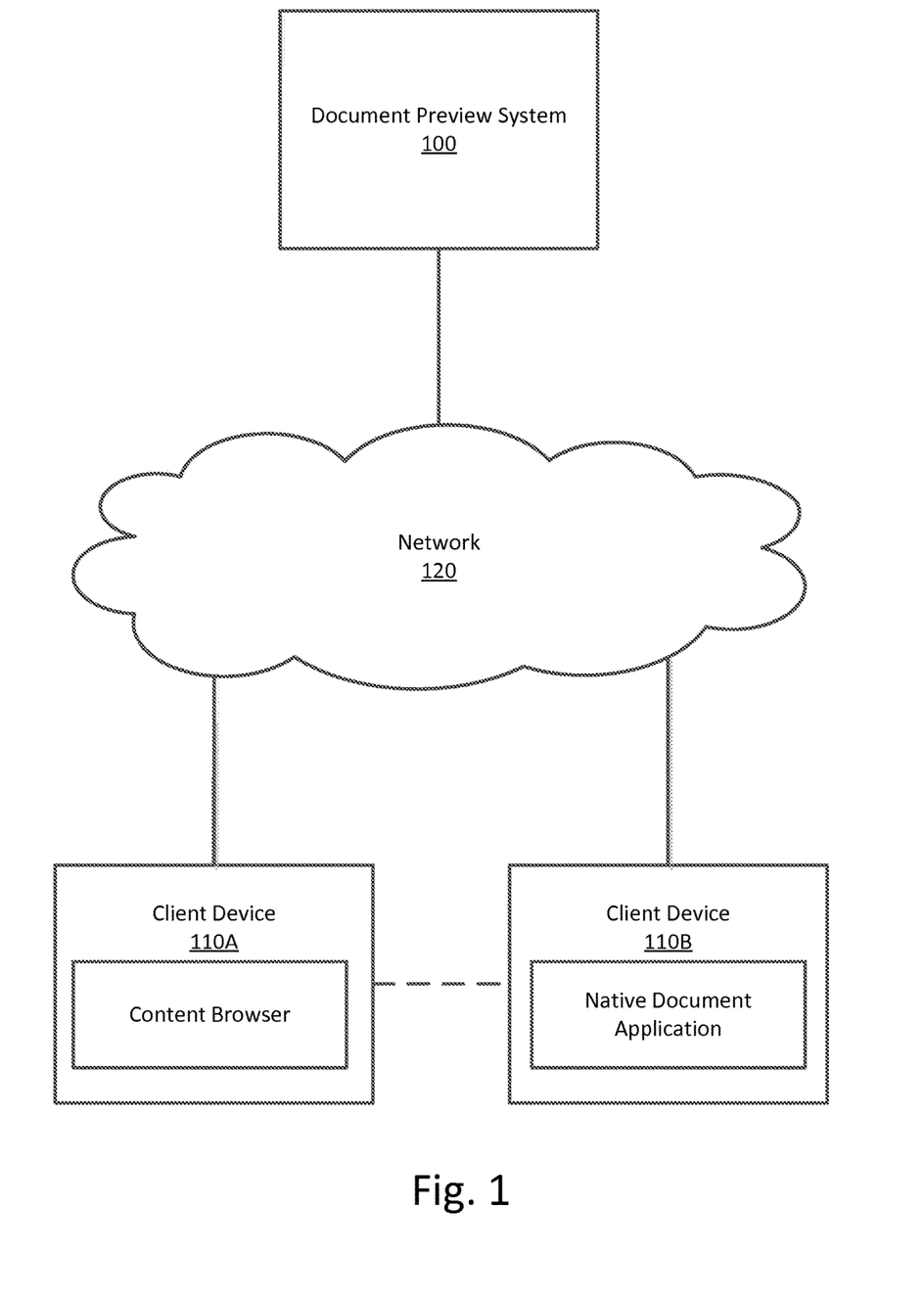
FIG. 1 shows an embodiment of an environment for presenting document previews using a task management with a content management system.

FIG. 1 shows an embodiment of an environment for presenting document previews using a task management with a content management system. FIG. 1 includes client devices 110A, and 110B (referred to generally as client device 110), document preview system 100, and network 120. Two client devices 110 are shown only for purpose of illustration; in practice any number of client devices may be present in the environment. Similarly, other modules or components described and illustrated throughout may include single or multiple instances as appropriate to the needs of the implementer and without loss of generality. Document preview system 100 stores native documents and provides native documents and previews of the native documents to client devices 110. A native document is a document created using an application program and that uses particular formatting and rendering functionality of the application program for its display on client device 110. As examples, these native documents may include word processing documents, spreadsheets, presentations, and source code, which are typically created and modified by dedicated, full-service applications on a client device. These native documents may be stored as a local copy of the document on a client device 110 or may be processed at client device 110 and remotely stored at the document preview system 100. The document preview system 100 provides a preview of the document to client devices 110 for display to a user. The preview is a display of the document and may be in another file format from the native document, such as a picture, image, Portable Document Format (pdf), or similar that may more readily be viewed by various client devices, but typically does not permit modification of the underlying native document.

Client Device 110 may be any suitable computing device for viewing and modifying documents stored at document preview system 100. Client devices 110 may also synchronize documents that are locally stored at client device 110 with document preview system 100. When documents are synchronized, changes or modifications to a document at client device 110 are transmitted to document preview system 100 and reflected in the document stored at document preview system 100 and vice versa. In some embodiments of document preview system 100 and the document preview techniques disclosed herein, documents are not synchronized. In other embodiments, features of document preview system 100 are performed at client device 110 to provide previews to other client devices 110, without a centralized document preview system 100. Examples of devices include desktop and laptop computers, hand-held mobile devices, tablet computers, and other computing devices. The operation of client device 110 in various embodiments is further described below.

Client devices 110 also execute various applications and other executable programs. As shown in FIG. 1, client device 110A includes a content browser application and client device 110B includes a native document application, though client devices 110 may include either or both of these applications, among other applications and features of client device 110. A content browser accesses previews of a native document from document preview system 100 and displays the previews to the user. A typical content browser is a web browser that interprets a mark-up language to provide a display to the user, though various other types of browsers may be implemented as the content browser. The content browser may also receive instructions from the document preview system for displaying comments to a user within the preview of a document. The instructions may indicate content for the comment along with portions of the preview at which to display the comment. In addition, the content browser may display an interface for a user to insert and modify comments to a preview. To add a comment, the content browser receives a selection of a portion of the preview from the user, along with a comment. The selection of a portion of the preview and the comment are transmitted to the document preview system 100 for incorporation into the native document.

The native document application creates and modifies native documents on client device 110. Such native document applications include productivity applications such as word processing applications, spreadsheet applications, presentation applications, as well as other applications according to the type of native document modified by client device 110, such as a development platform for modifying source code. When client device 110 is synchronized with document preview system 100, modifications to the native document performed by the native document application are synchronized to document preview system 100.

Each client device 110 communicates with document preview system 100 through network 120. Network 120 is any suitable network and may include local networks, corporate networks, global networks, and any combination of these. In typical configurations, client devices 110 communicate via a wired or wireless communication network to a local network service provider, and communicate with document preview system 100 through the Internet. In certain configurations, client devices 110A and 110B communicate directly with one another without network 120 as indicated in FIG. 1 by dashed lines. For example, devices 110 may communicate via a wired or wireless connection, such as wirelessly via a Bluetooth connection or a wired connection via a Universal Serial Bus (USB).

Document preview system 100 stores documents and provides document previews to client devices 110. Document preview system 100 provides a preview of a native document to permit an operator of client devices 110 to view the preview prior to accessing and modifying the native document. In the preview of the native document, the document preview system 100 provides comments present in the native document at the location of the comments in the native document and permit users to modify and add comments to the native document from a preview interface. The document preview system 100 stores modifications and additions to the comments in the native document, such that these modifications are viewable and modifiable by a native document application that accesses the native document.

Figure 2:
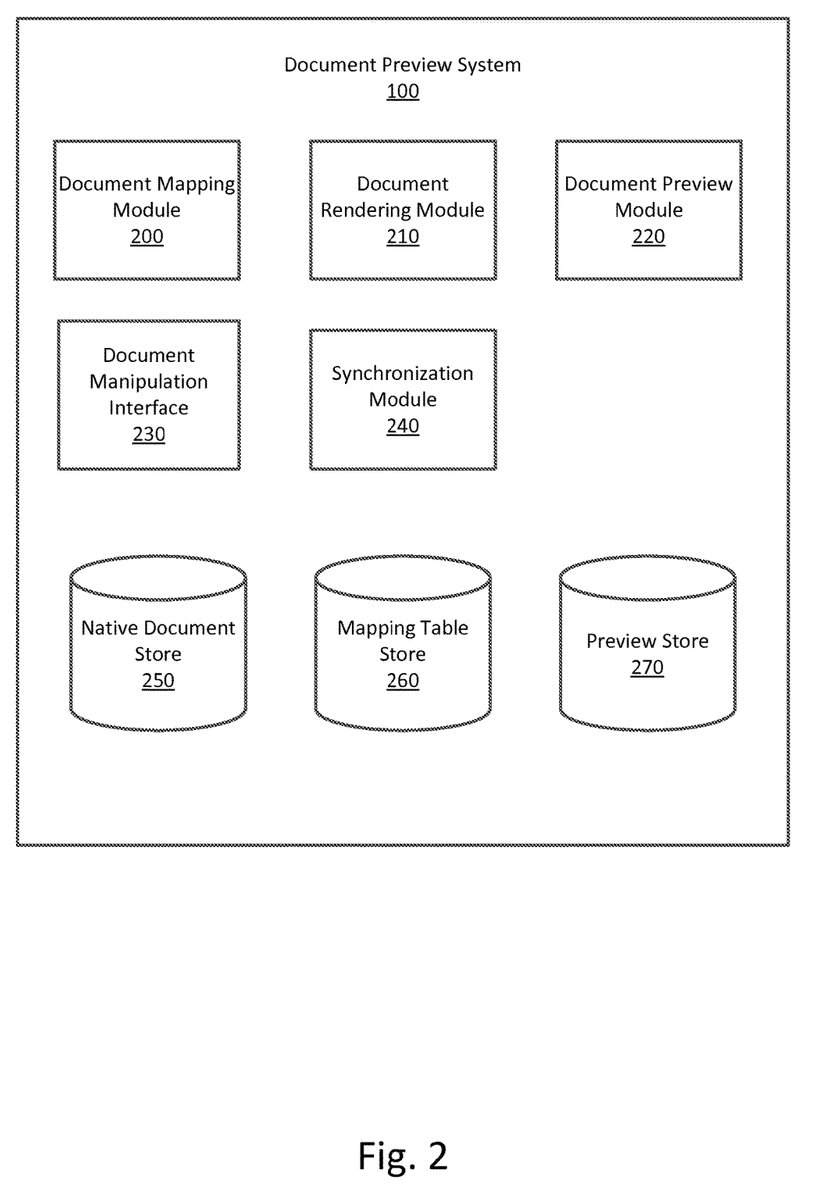
FIG. 2 shows components of document preview system according to one embodiment.

FIG. 2 shows components of document preview system 100 according to one embodiment. Document preview system 100 includes various modules and data stores for providing previews to client devices 110. Such modules include document mapping module 200, document rendering module 210, document preview module 220, document manipulation interface 230, and synchronization module 240. Data stores included in this embodiment are native document store 250, mapping table store 260, and preview store 270. To correctly display and receive comments to a native document, document preview system 100 identifies native objects within the native document and identifies bounding areas for the preview of the native document that are associated with the native objects. A native object is an object in the native application representing a particular piece of renderable content, such as a character, word, sentence, or paragraph. Various embodiments may implement a different granularity for identifying native objects in the same type of document. For example, a word processing document may be treated as having native objects at any of these levels, including characters or words. Identification of the bounding areas for the native objects is further described below.

Native document store 250 stores native documents. Mapping table store 260 maintains, for native documents in the native document store, a mapping table that associates native objects in the native document with a bounding area of the preview of a document. Preview store 270 stores generated previews of a native document.

Document manipulation interface 230 is an interface for manipulating and parsing native documents in native document store 250. In certain embodiments, the native documents are maintained in proprietary formats or otherwise difficult to directly manipulate. The document manipulation interface 230 provides an application programming interface for various modules to interact with the native documents 250. Document manipulation interface 230, for example, receives instructions to insert rendering markers, identify comments, and insert comments into a native document.

In embodiments where the native documents are synchronized with client devices 110, the synchronization module 240 manages this synchronization. When modifications are made to a native document in native document store 250, synchronization module 240 requests an update from document mapping module 200 to the previews of the document stored in preview store 270, and disseminates the modified document to the client devices 110 synchronized to the native document. The modifications to the native document may be performed by a user modifying a comment via the document preview module 220 or may be received from a client device 110 that has made a change to the native document.

Document mapping module 200 generates the mapping table for a native document. To generate the mapping table, the document mapping module analyzes the native document to identify native objects within the native document. The document mapping module applies a parser that interprets the formatting of the native document to identify the portions of a native document that are displayed to a user. For example, the parsing performed by document mapping module 200 may disregard font sizes, styles, and other formatting to identify the native objects, such as characters or words, within the document. In some embodiments the mapping module identifies certain formatting as a native object, for example a line or page break.

After identifying the native objects in a native document, the document mapping module 200 generates a rendering marker for each native object in the document. The rendering marker is a unique marker that identifies the associated native object and does not affect the display of the document when rendered. For example, a rendering marker in one embodiment is a hyperlink with a unique code for the native object it is applied to, and in another embodiment the rendering marker may be a flag, header, or special instruction applicable to document rendering module 210. The document mapping module inserts each rendering marker in the native document at the location of each native object.

Next, document mapping module 200 provides the native document to document rendering module 210 to be rendered into a preview. Document rendering module 210 generates previews of a native document by converting the native document into preview format, such as PDF document. When the document rendering module 210 performs the rendering, the document rendering module 210 also generates various metadata about the rendered document. This metadata includes an identification of bounding areas for each of the rendering markers in the native document. The bounding areas identify, on the rendered preview, the location of each rendering marker, for example by page and pixel range. The generated preview may be stored in the preview store 270 and the resulting metadata and bounding areas with associated rendering markers provided to document mapping module 200. Document mapping module 200 stores the bounding areas for each rendering marker in the mapping table for the native document. In one embodiment that uses hyperlinks as the rendering marker, the preview is generated as a PDF document and includes identification of the bounding areas for the hyperlinks (rendering markers) as an output of the document mapping module 200.

Figure 3:
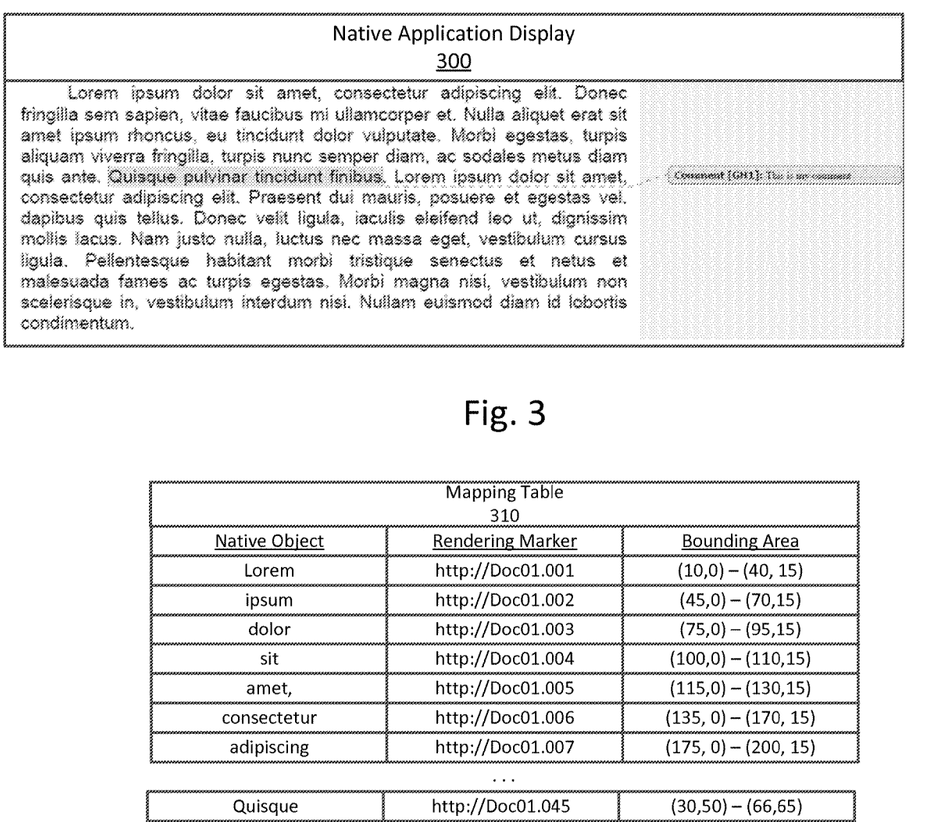
FIG. 3 shows an example native document shown in a display and an associated mapping table.

FIG. 3 shows an example native document shown in a display 300 and an associated mapping table 310. Native application display 300 shows the document as it would be displayed in the native document application executing on client device 110. When the native document is mapped by document mapping module 200 and document rendering module 210, example mapping table 310 is generated. In this example, each word in the native document is treated as a native object. A rendering marker is inserted as a unique link associated with the individual native objects in the native application. When the preview is rendered, document rendering module 210 generates the bounding areas for each rendering marker which are associated with the rendering marker and native object in the mapping table 310. This mapping table 310 provides an association between a native object as stored in the native document and a bounding area that is shown actually to a user in the preview. In addition, since the bounding areas are generated by the rendering process, the bounding areas account for formatting, page changes, and other effects of converting the native document to a preview that may not have been accounted for if the native document were viewed in a native application.

Returning to FIG. 2, document preview module 220 provides previews native documents to client devices 110 along with any comments associated with the native document. When a user requests a preview of a native document, document preview module 220 retrieves a rendered preview from preview store 270. Document preview module 220 accesses document manipulation interface 230 to retrieve any comments stored in the native document. The comments retrieved from document manipulation interface 230 include an identification of the native objects to which each comment applies. As an example, the comment may indicate that it applies to a particular group of words. Document preview module 220 determines the native objects associated with the comment and identifies the bounding areas associated with the comment by joining the bounding areas of the related native objects in the mapping table. The document preview module 220 provides the preview along with the bounding area of the comment to the requesting client device 110 for display to the user. The requesting client device 110 receives the preview and comment from document preview module 220 and provides the preview to the operator of client device 110. Client device 110 also displays the comment at the location indicated by the bounding area for the content provided by document preview module 220.

Client device 110 may also provide the user with an interface to add a comment to the preview. The user selects a portion of the preview and adds a comment to the preview using the interface. When the comment is received, client device 110 provides the comment and selection to document preview module 220. Document preview module 220 identifies native objects corresponding to the comment by matching location information of the selection with native objects in the mapping table. The native objects that have matching bounding areas to the selection of comment area are selected as the native objects associated with the comment. To incorporate the comment, document preview module 220 provides document manipulation interface 230 with an identification of the native objects and the comment, and document manipulation interface 230 inserts the comment in the native document. The native document is updated by the addition of the comment and the synchronization module 240 propagates the change to any synchronized client devices 110. In this way, a user may modify or add a comment on a preview through a content browser, and the modification to the comment may appear in the native document application on another client device 110. This permits quick and easy review and modification of comments through the content browser interface without requiring a user to load a native document application, while permitting users of native document applications to see comments made by a content browser directly in the native document application.

Figure 4:
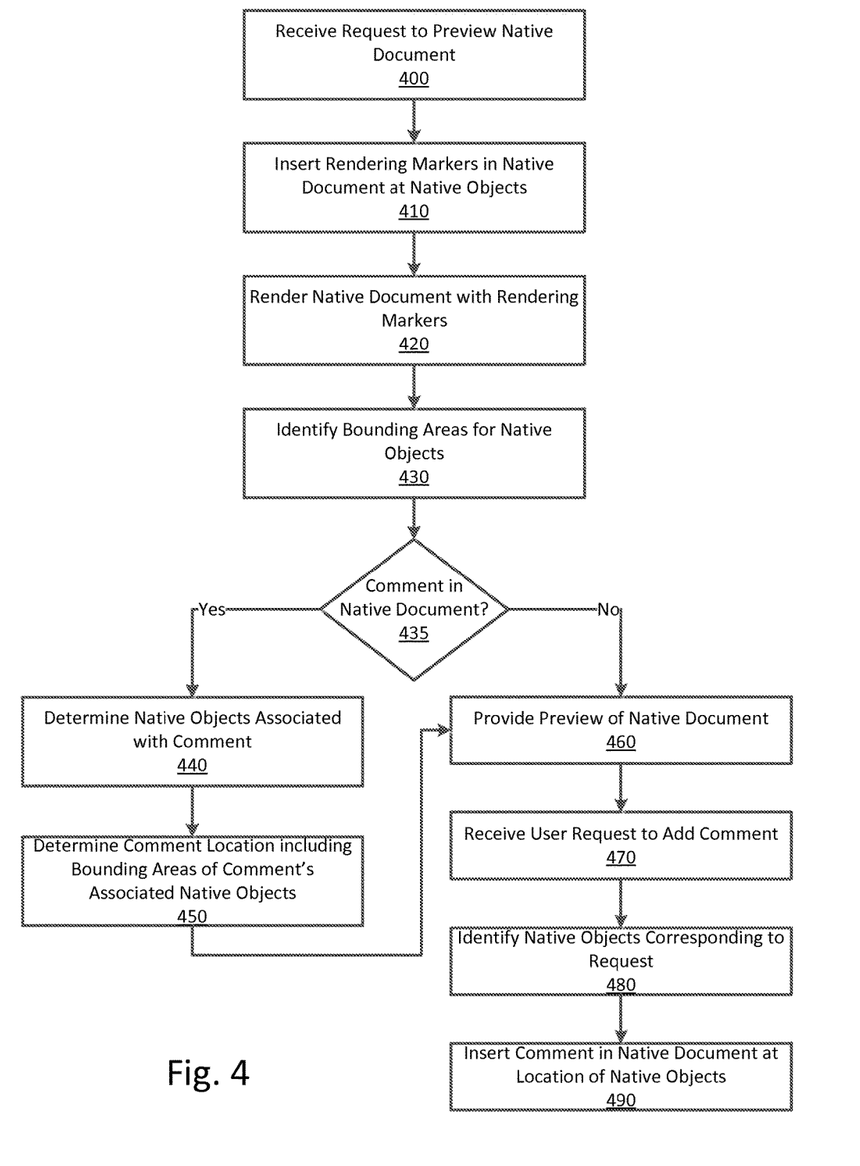
FIG. 4 shows an example method for identifying the location of native objects in a preview and displaying and modifying comments for a native document.

FIG. 4 shows an example method for identifying the location of native objects in a preview and displaying and modifying comments for a native document. This method may be performed by various components of document preview system 100 as described above. Initially, document preview system 100 receives 400 a request to preview a native document from client device 110. Next, unique rendering markers are inserted 410 in the native document at each of the native objects. Then, a preview of the native document is rendered 420 with the rendering markers, which generates a set of bounding areas associated with each rendering market. Document preview system 100 identifies 430 bounding areas for the native objects as the bounding areas for the rendering markers associated with the native objects. Prior to sending a preview for the user, document preview system 100 determines 435 whether there are pre-existing comments to be rendered with the preview. When there are no comments, the preview of the native document is provided 460 to the requesting client device 110.

When there are comments in the native document, document preview system 100 determines 440 which native objects are associated with the comment and the associated bounding areas from those native objects. Next, the comment location for the comment is determined by joining the bounding areas of the native objects associated with the comment. The native objects and comment locations are determined 440, 450 for each of the comments and the preview of the native document is provided 460 with the comments and associated comment locations.

In other embodiments, some of these steps may be performed prior to receipt of a request for a preview in order to reduce the processing performed between a request and display of a preview. These steps may be performed, for example, on a periodic basis (e.g., once per day), or in response to a modification of the native document. For example, the unique rendering markers are inserted, a preview generated, and bounding areas for comments may be identified prior to the request for the preview.

Client device 110 may also provide a user's request to add a comment to the native document, which is received 470 by document preview system 100. Document preview system 100 identifies 480 native objects corresponding to the request by identifying the bounding areas of the native objects that match the selected location in the preview in the request to add a comment. Using the identified native objects, document preview system 100 inserts 490 the comment in the native document at the native objects identified for the request.

In one embodiment, document rendering module 200 creates a copy of the native document when inserting the rendering markers and the document preview to determining bounding areas associated with the rendering markers. In this embodiment, the original native document is not altered in identifying the bounding areas associated with the native objects. In this embodiment, two previews may be generated, one preview that incorporates the rendering markers to generate the bounding areas for the native objects, and one preview that is based on the unmodified native document. In this embodiment, the original native document is not modified by the identification of bounding areas. In another embodiment, document preview system 100 removes the rendering objects from the native document prior to synchronizing the native document with client devices 110 or otherwise permitting users to retrieve the native document.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

generating, by a document system and for a native document, a set of rendering markers, each rendering marker associated with a different native object in the native document;

after generating the set of rendering markers, receiving, by the document system, a request to generate a preview of the native document, the preview representing the native document in a file format other than the file format of the native document; and generating, by the document system, the preview of the native document, wherein generating the preview includes generating a bounding area for each of the rendering markers in the set of rendering markers, the bounding area mapping a location in the preview to the native object in the native document.

2. The method of claim 1, wherein the request to generate the preview is received from a client device, and wherein the preview is generated responsive to receiving the request.

3. The method of claim 1, wherein the preview is generated prior to receipt of the request to generate the preview of the native document.

4. The method of claim 1, further comprising:
synchronizing the native document with one or more client devices; and
inserting the set of rendering markers into a copy of the native document;
wherein the set of rendering markers are identified and the preview is generated from the copy of the native document.

5. The method of claim 1, further comprising:
synchronizing the native document with one or more client devices; and
removing the set of rendering markers from the native document prior to synchronization.

6. The method of claim 1, further comprising:
identifying a comment in the native document;
determining at least one native object associated with the comment in the native document; and
determining a bounding area for the comment by combining the bounding areas for the rendering markers of the at least one native object associated with the comment.

7. The method of claim 1, further comprising:
receiving a request to add a comment to the preview indicating a selected portion of the preview for the comment;
identifying a set of native objects corresponding to the selected portion of the preview by matching the selected portion to bounding areas associated with the identified set of native objects; and
inserting the comment in the native document at the identified set of native objects.

8. The method of claim 1, wherein generating the set of rendering markers comprises:
generating a mapping table that maps an identity of each native object in the native document to a bounding area associated with the native object, the bounding area defining a pixel range within the native document associated with the native object.

9. The method of claim 1, wherein the native objects are selected from a group consisting of characters, words, and sentences.

10. The method of claim 1, wherein the bounding area for a native object accounts for formatting effects of the preview in the other file format during generation of the preview.

11. The method of claim 10, wherein the formatting effects include format and page changes in the preview relative to the native document.

12. The method of claim 1, wherein generating the preview further comprises generating metadata of the preview, the metadata including an identification of the bounding areas for each rendering marker in the native document.

13. A computer-implemented method comprising:
generating, by a document system and for a native document, a set of rendering markers, each rendering marker associated with a different native object in the native document;
after generating the set of rendering markers, receiving, by the document system, a request to add a comment to a preview indicating a selected portion of the preview for the comment; and
inserting, by the document system, the comment in the native document based on the set of rendering markers.

14. The method of claim 13, wherein:
each rendering marker is associated with a bounding area in the preview mapping a location in the preview to a native object in the native document; and
identifying the set of rendering markers corresponding to the selected portion of the preview comprises:
identifying a set of bounding areas intersecting at least a portion of the selected portion of the preview and
determining the set of rendering markers corresponding to the identified set of bounding areas.

15. The method of claim 13, wherein inserting the comment in the native document comprises:
identifying a set of native objects corresponding to the set of rendering markers; and
inserting the comment in association with the identified set of native objects.

16. A system comprising:
a processor configured to execute instructions;
a non-transitory computer-readable medium containing instructions that when executed by the processor cause the processor to perform steps of:
generating, by a document system and for a native document, a set of rendering markers, each rendering marker associated with a different native object in the native document;
after generating the set of rendering markers, receiving, by the document system, a request to generate a preview of the native document, the preview representing the native document in a file format other than the file format of the native document; and
generating, by the document system, the preview of the native document, wherein generating the preview includes generating a bounding area for each of the rendering markers in the set of rendering markers, the bounding area mapping a location in the preview to the native object in the native document.

17. The system of claim 16, wherein the request to generate the preview is received from a client device, and wherein the preview is generated responsive to receiving the request.

18. The system of claim 16, wherein the preview is generated prior to receipt of the request to generate the preview of the native document.

19. The system of claim 16, wherein the instructions further cause the processor to perform steps of:
synchronizing the native document with one or more client devices; and
inserting the set of rendering markers into a copy of the native document;
wherein the set of rendering markers are identified and the preview is generated from the copy of the native document.

20. The system of claim 16, wherein the instructions further cause the processor to perform steps of:
synchronizing the native document with one or more client devices; and removing the set of rendering markers from the native document prior to synchronization.

21. The system of claim 16, wherein the instructions further cause the processor to perform steps of:
identifying a comment in the native document;
determining at least one native object associated with the comment in the native document; and
determining a bounding area for the comment by combining the bounding areas for the rendering markers of the at least one native object associated with the comment.

22. The system of claim 16, wherein the instructions further cause the processor to perform steps of:
receiving a request to add a comment to the preview indicating a selected portion of the preview for the comment;
identifying a set of native objects corresponding to the selected portion of the preview by matching the selected portion to bounding areas associated with the identified set of native objects; and
inserting the comment in the native document at the identified set of native objects.

23. The system of claim 16, wherein the instructions for generating the set of rendering markers further cause the processor to perform steps of:
generating a mapping table that maps an identity of each native object in the native document to a bounding area associated with the native object, the bounding area defining a pixel range within the native document associated with the native object.

24. The system of claim 16, wherein the native objects are selected from a group consisting of characters, words, and sentences.

25. The system of claim 16, wherein the bounding area for a native object accounts for formatting effects of the preview in the other file format during generation of the preview.

26. The system of claim 25, wherein the formatting effects include format and page changes in the preview relative to the native document.

27. The system of claim 16, wherein generating the preview further comprises generating metadata of the preview, the metadata including an identification of the bounding areas for each rendering marker in the native document.

28. A system comprising:
a processor configured to execute instructions;
a non-transitory computer-readable medium containing instructions that when executed by the processor cause the processor to perform steps of:
generating, by a document system and for a native document, a set of rendering markers, each rendering marker associated with a different native object in the native document;
after generating the set of rendering markers, receiving, by the document system, a request to add a comment to a preview indicating a selected portion of the preview for the comment; and
inserting, by the document system, the comment in the native document based on the set of rendering markers.

29. The system of claim 28, wherein each rendering marker is associated with a bounding area in the preview mapping a location in the preview to a native object in the native document; and the instructions further cause the processor to perform steps of:
identifying the set of rendering markers corresponding to the selected portion of the preview comprises:
identifying a set of bounding areas intersecting at least a portion of the selected portion of the preview and
determining the set of rendering markers corresponding to the identified set of bounding areas.

30. The method of claim 28, wherein inserting the comment in the native document comprises:
identifying a set of native objects corresponding to the set of rendering markers; and
inserting the comment in association with the identified set of native objects.

* * * * *